United States Patent
Platner et al.

(10) Patent No.: US 7,722,065 B2
(45) Date of Patent: May 25, 2010

(54) COMPOSITE SPRING WITH RESILIENT ATTACHMENT INTERFACE

(75) Inventors: David K. Platner, Shelby, MI (US); Arnett R. Weber, Burlington (CA); Rajesh J. Somnay, Troy, MI (US); Holly Ann Giangrande, Troy, MI (US); Tomaz Dopico Varela, Shelby Township, MI (US); Brian J. Knouff, Dayton, OH (US); Benjamin R. Reineck, Waterford, MI (US); Norman D. Austin, Kutztown, PA (US); John E. Mutzner, Covington, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 299 days.

(21) Appl. No.: 11/733,228

(22) Filed: Apr. 10, 2007

(65) Prior Publication Data
US 2008/0252033 A1    Oct. 16, 2008

(51) Int. Cl.
*B60G 11/04* (2006.01)
*B60G 11/12* (2006.01)
*B60G 11/02* (2006.01)
*F16F 1/366* (2006.01)

(52) U.S. Cl. .......................... 280/124.175; 280/124.17; 267/36.1; 267/40; 267/148; 267/149; 267/260; 267/269

(58) Field of Classification Search ............ 280/124.17, 280/124.175; 267/148, 149, 36.1, 260, 40, 267/41, 46, 269
See application file for complete search history.

(56) References Cited

U.S. PATENT DOCUMENTS

| | | | | |
|---|---|---|---|---|
| 2,191,528 A * | 2/1940 | Hewel | ........................ | 267/271 |
| 3,250,546 A * | 5/1966 | Allison | ................ | 280/124.176 |
| 3,586,307 A * | 6/1971 | Brownyer | ..................... | 267/47 |
| 4,172,590 A * | 10/1979 | Jarret et al. | .................. | 267/149 |
| 4,519,590 A * | 5/1985 | Wells | ........................... | 267/52 |
| 4,611,793 A * | 9/1986 | Nishiyama et al. | ............. | 267/52 |
| 4,637,595 A * | 1/1987 | Mishima et al. | ............... | 267/52 |
| 4,659,071 A * | 4/1987 | Woltron | ....................... | 267/149 |
| 4,684,110 A * | 8/1987 | Sale et al. | ...................... | 267/52 |
| 4,696,459 A * | 9/1987 | Woltron et al. | ............. | 267/36.1 |
| 4,747,898 A * | 5/1988 | Woltron | ....................... | 156/153 |
| 4,768,807 A * | 9/1988 | McGibbon et al. | ..... | 280/124.14 |
| 4,771,997 A * | 9/1988 | Haldenwanger et al. | .... | 267/260 |
| 4,772,044 A * | 9/1988 | Booher | ................ | 280/124.134 |
| 4,802,659 A * | 2/1989 | Hope | .......................... | 267/149 |
| 4,887,802 A * | 12/1989 | Wilcox | ........................ | 267/148 |
| 4,895,350 A * | 1/1990 | Schoof et al. | .................. | 267/52 |
| 4,969,633 A * | 11/1990 | Ryan | ........................... | 267/47 |

(Continued)

*Primary Examiner*—Paul N. Dickson
*Assistant Examiner*—Barry Gooden, Jr.
(74) *Attorney, Agent, or Firm*—Carlson, Gaskey & Olds

(57) ABSTRACT

A leaf spring for a vehicle suspension is formed from a composite material and includes first and second ends that are longitudinally spaced apart from each other. A resilient element is attached to at least one of the first and second ends. The resilient element includes at least one hole that receives a connecting element. The resilient element and the connecting element cooperate to attach the leaf spring to a vehicle structure. In one example, the resilient element comprises a rubber block that is bonded to the leaf spring. In another example, the resilient element comprises a longitudinally orientated bushing that is inserted through a thickness of the leaf spring.

21 Claims, 3 Drawing Sheets

U.S. PATENT DOCUMENTS

| | | | | |
|---|---|---|---|---|
| 4,991,827 A * | 2/1991 | Taylor | | 267/149 |
| 5,129,672 A * | 7/1992 | Hiromoto et al. | | 280/124.106 |
| 5,251,930 A * | 10/1993 | Kusaka et al. | | 280/124.14 |
| 5,358,210 A * | 10/1994 | Simon et al. | | 248/628 |
| 5,509,684 A * | 4/1996 | Yarrow et al. | | 280/124.17 |
| 6,012,709 A * | 1/2000 | Meatto et al. | | 267/36.1 |
| 6,029,987 A * | 2/2000 | Hoffman et al. | | 280/124.171 |
| 6,056,276 A * | 5/2000 | Muzio | | 267/36.1 |
| 6,189,904 B1 * | 2/2001 | Gentry et al. | | 280/124.175 |
| 6,273,441 B1 * | 8/2001 | Neavitt et al. | | 280/124.174 |
| 6,390,486 B1 * | 5/2002 | Boes et al. | | 280/124.171 |
| 6,659,482 B2 * | 12/2003 | Carlstedt et al. | | 280/124.14 |
| 6,811,169 B2 * | 11/2004 | Schroeder et al. | | 280/124.171 |
| 7,032,624 B2 * | 4/2006 | Bruske et al. | | 139/57 |
| 2003/0122293 A1 * | 7/2003 | Akhtar et al. | | 267/36.1 |

* cited by examiner

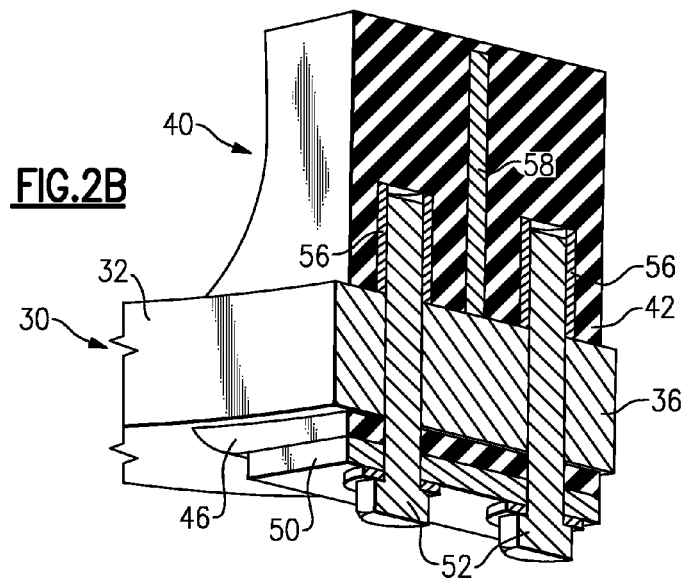
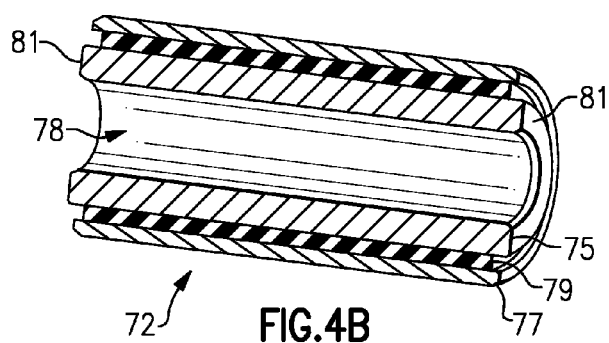
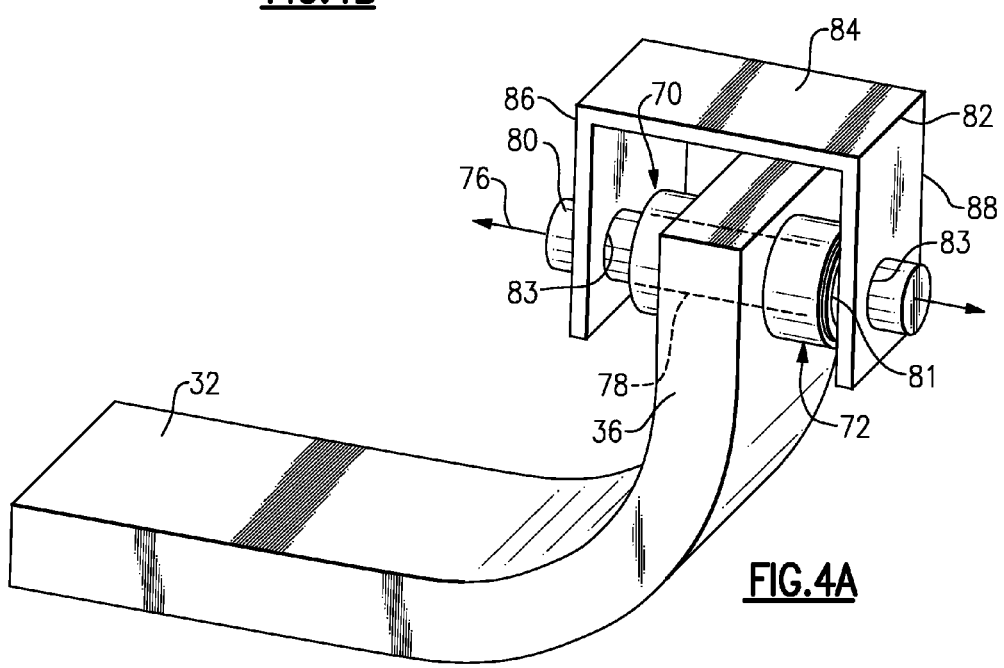

COMPOSITE SPRING WITH RESILIENT ATTACHMENT INTERFACE

TECHNICAL FIELD

The subject invention relates to a composite spring for a vehicle suspension with a resilient attachment interface for securing the composite spring to a vehicle structure.

BACKGROUND OF THE INVENTION

Vehicle suspensions include springs that cooperate with other suspension components to improve ride and handling characteristics for a vehicle. One type of spring used in vehicle suspensions is a composite leaf spring. The composite leaf spring extends in a longitudinal direction and has first and second ends that are pivotally mounted to a vehicle frame. A center portion of the composite leaf spring is supported by an axle component, which extends in a lateral direction across a width of the vehicle.

Each of the first and second ends of the composite leaf spring includes a metal bracket. Traditionally, each metal bracket comprises an aluminum extrusion that is mechanically fastened to the composite leaf spring. The metal bracket is configured to receive a press-fit bushing such that each of the first and second ends can be pivotally attached to shackles on the vehicle frame. Utilizing this type of bracket and mounting configuration is not ideal from a cost and material standpoint.

Thus, there is a need for an improved mounting interface for composite leaf springs that overcomes the deficiencies in the prior art discussed above.

SUMMARY OF THE INVENTION

A composite spring for a vehicle suspension includes first and second ends that are longitudinally spaced apart from each other. A resilient element is attached to at least one of the first and second ends. The resilient element includes at least one hole for receiving a connecting element. The resilient and connecting elements cooperate to attach the composite spring to a vehicle frame.

In one disclosed embodiment, the resilient element comprises a rubber block that is bonded to an external surface of the composite spring. Fasteners are inserted through the composite spring and rubber block to secure the composite spring to a vehicle structure.

In one disclosed embodiment, two rubber blocks are used, one rubber block being bonded to an upper surface of the composite spring and one rubber block being bonded to a lower surface of the composite spring. In one example, a rigid plate is then bonded to each outwardly facing surface of the rubber blocks and fasteners are inserted through the rigid plates, rubber blocks, and composite spring to secure the composite spring to a vehicle structure. An additional rigid plate or plates may be molded within the rubber blocks to increase lateral stiffness as needed.

In one disclosed embodiment, the resilient element comprises a bushing that is inserted through a thickness of at least one of the first and second ends. The at least one of the first and second ends is curved upwardly such that the bushing extends in a generally longitudinal direction. Two longitudinally extending bushings could be used to increase lateral stiffness as needed. Optionally, the bushing may include an internal ball joint to increase fore and aft strength as needed.

By attaching resilient elements to ends of the composite spring, it is easier to mount the composite spring to a vehicle structure. Further, this attachment interface reduces the amount of additional attachment hardware that is needed to secure the composite springs to the vehicle structure, which correspondingly reduces weight and cost.

These and other features of the present invention can be best understood from the following specification and drawings, the following of which is a brief description.

BRIEF DESCRIPTION OF THE DRAWINGS

FIG. 2B is a cross-sectional view of FIG. 2A.

FIG. 4A is another example of a composite spring and resilient mount configuration.

FIG. 4B is an example resilient bushing for the resilient mount configuration in FIG. 4A.

DETAILED DESCRIPTION OF THE PREFERRED EMBODIMENT

Figure 1:
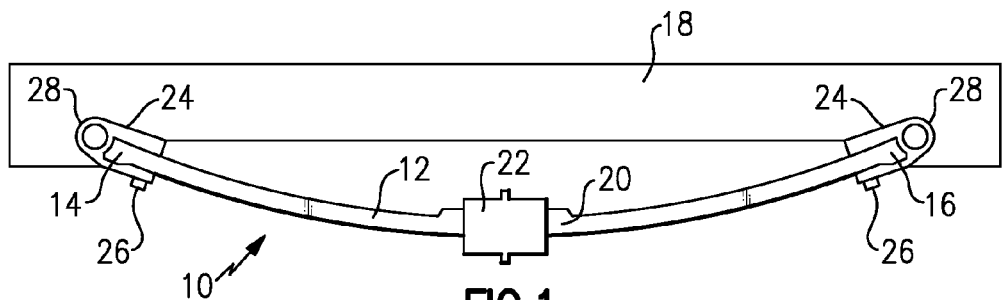
FIG. 1 is a schematic view of a prior art suspension assembly incorporating the subject invention.

A leaf spring assembly 10 designed according to the prior art is shown in FIG. 1. The leaf spring assembly 10 includes one or more elongate spring bodies 12 formed from a composite material that includes first 14 and second 16 ends that are mountable to a vehicle structure 18, such as a frame member for example. A center portion 20 of the spring body 12 is mounted to an axle (not shown) with a mounting component 22, such as a plate and fastener assembly. The spring body 12 extends in a longitudinal direction along a vehicle length and the axle extends along a lateral direction across a vehicle width.

Each of the first 14 and second 16 ends includes an extruded aluminum component 24 that is mechanically attached to the spring body 12 with fasteners 26. Each extruded aluminum component 24 includes a circular boss portion 28 with a bore that receives a bushing to pivotally mount the first 14 and second 16 ends to the vehicle structure 18. The use of the extruded aluminum component 24 is disadvantageous from a cost and material standpoint.

Figure 2A:
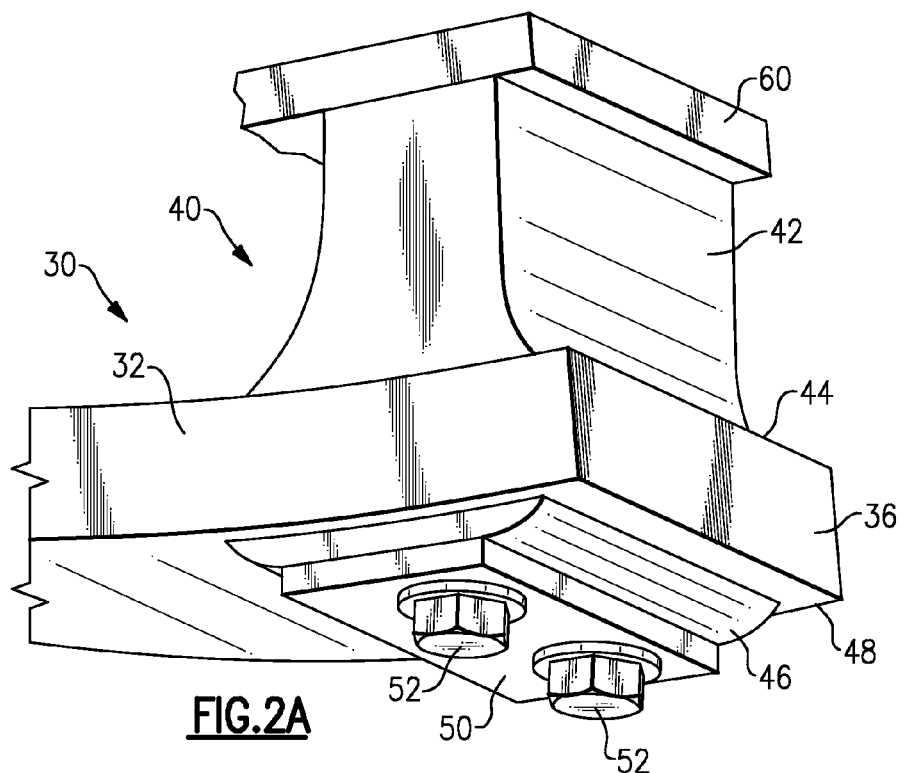
FIG. 2A is one example of a composite spring and resilient mount configuration.

One leaf spring assembly 30 designed according to the present invention is shown in FIG. 2A. The leaf spring assembly 30 includes an elongate spring body 32 formed from a composite material that extends between first and second spring ends similar to the configuration shown in FIG. 1; however at least one of the first and second spring ends is uniquely configured to include resilient elements that facilitate mounting of a spring end 36 to a vehicle structure. The spring body 32 can be formed from any suitable composite material, and can be used in any type of suspension for any type of axle.

FIGS. 2A-2B show one example of a resilient element 40 that is used to attach one spring end 36 to the vehicle structure 18 (FIG. 1). While only one spring end 36 is shown in FIGS. 2A-2B, it should be understood that the opposite spring end could be similarly configured. In this example, the resilient element 40 comprises a first resilient block 42 bonded to an upper surface 44 of the spring end 36 and a second resilient block 46 bonded to a lower surface 48 of the spring end 36. The first 42 and second 46 resilient blocks are formed from an elastomeric material such as rubber, for example.

A first metal plate 50 is positioned directly underneath the second resilient block 46. Fasteners 52 are used to secure the first 42 and second 46 resilient blocks to the spring end 36. The first metal plate 50 can be bonded to the second resilient block 46 and/or can be secured to the second resilient block with the fasteners 52. The fasteners 52 extend through openings in the first metal plate 50, the second resilient block 46, the spring end 36, and first resilient block 42. Rigid tubular inserts 56 (FIG. 2B) are pressed into the openings in the first resilient block 42 to receive the fasteners 52. A rigid insert plate 58 can be molded within the first resilient block 42 to increase lateral stiffness. In the example shown, the rigid insert plate 58 is positioned centrally between the two rigid tubular inserts 56.

The first resilient block 42 is then directly secured to the vehicle structure 18 without requiring any bracket or bushing components. A second metal plate 60 and additional tubular inserts 56 could be used to secure the first resilient block 42 to the vehicle structure.

Figure 3:
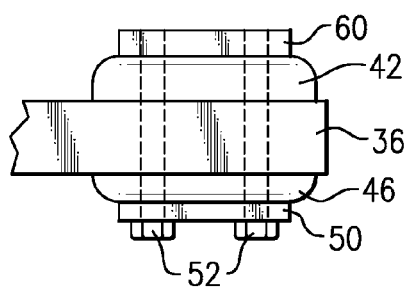
FIG. 3 is another example of a composite spring and resilient mount configuration.

FIG. 3 shows an example similar to that of FIGS. 2A-2B; however, the tubular inserts 56 are eliminated. First 50 and second 60 metal plates are included and the fasteners extend all the way through the first metal plate 50 to the second metal plate 60 as shown. Additional fasteners (not shown) can then be used to secure the second metal plate 60 to the vehicle structure 18.

FIG. 4A shows another example of a resilient element 70 that is used to attach one spring end 36 to the vehicle structure 18. Again, only one spring end 36 is shown, and it should be understood that the other spring end could be similarly configured. In this example, the resilient element 70 comprises at least one bushing 72 that is pressed into, or molded into, a bore 74 formed within the spring end 36.

The spring body 32 is formed to have a length that extends in the longitudinal direction, a width that extends in the lateral direction, and thickness that extends in the vertical direction when the spring body 32 is in a flat or unflexed position. In the configuration of FIG. 4A, the spring end 36 is curved upwardly such that a least a component of the spring end 36 extends in a generally vertical direction. In this orientation, the bore 74 extends in a generally longitudinal direction through the thickness of the spring body 32. The bore 74 thus defines a central longitudinal axis as indicated at 76, about which the spring end 36 can twist or rotate. A connecting element 80 secures the spring end 36 to the vehicle structure 18 via a bracket 82

As illustrated in FIG. 4B, the bushing 72 includes an inner sleeve 75, an outer sleeve 77, and a resilient sleeve 79 between the inner sleeve 75 and the outer sleeve 77. For example, the inner sleeve 75 and the outer sleeve 77 are metal, and the resilient sleeve 79 is rubber or other resilient polymeric material. In the illustrated example, the inner sleeve 75 is longer than the outer sleeve 77 and resilient sleeve 79 to form a lip 81 at each end of the bushing 72. The inner sleeve 75 defines a center bore 78 that receives a connecting element 80 (FIG. 4A) to secure the spring end 36 and the base 84 together.

The bracket 82 includes a base 84 that is secured to the vehicle structure 18, and first and second legs 86 and 88 having an opening 83 that receives the connecting element 80. Tightening the connecting element 80 compresses the inner sides of the legs 86 and 88 against the lips 81 of the bushing 72 such that the bushing 72 is rigidly attached to the bracket 72. The bracket 82 is just one type of mount for attaching the spring end 36 to the vehicle structure 18; other mounting bracket configurations could also be utilized. The configuration shown in FIG. 4A can be used to increase axial stiffness as needed depending upon desired suspension characteristics. Radial compliance/stiffness of the bushing accommodates vertical and lateral forces of the spring.

Figure 5:
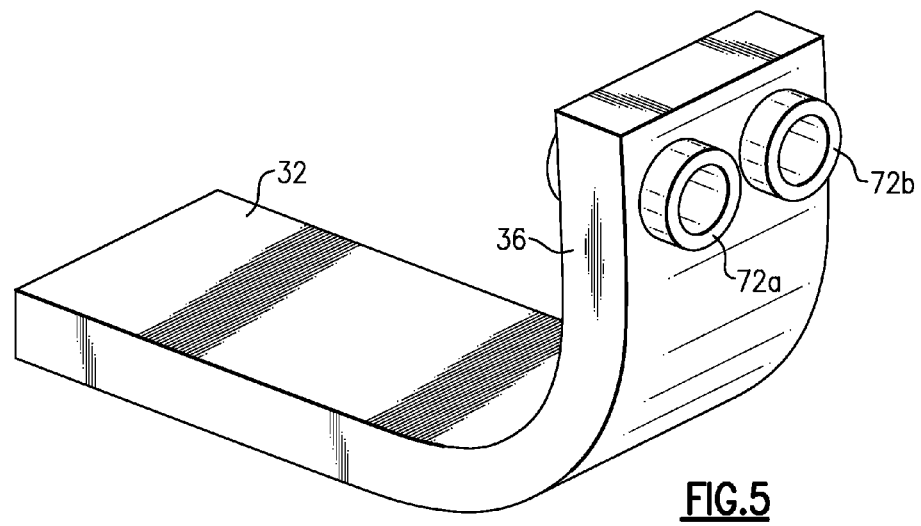
FIG. 5 is another example of a composite spring and resilient mount configuration.

FIG. 5 shows a similar configuration to that of FIG. 4; however, instead of using one longitudinal bushing 72, two longitudinal bushings 72a, 72 be are used. This provides additional lateral stiffness.

Figure 6B:
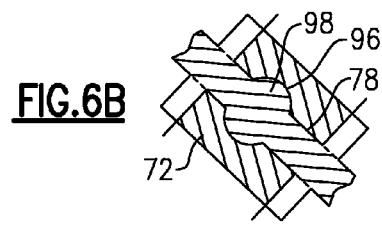
FIG. 6B is a cross-sectional view of FIG. 6A.
Figure 6A:
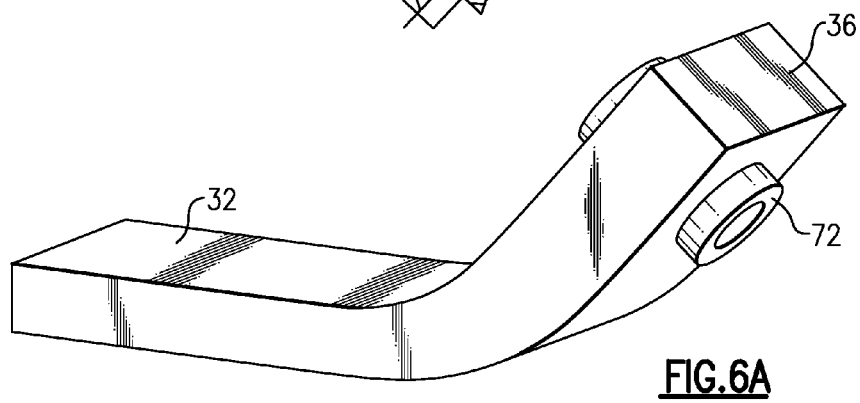
FIG. 6A is another example of a composite spring and resilient mount configuration.

FIG. 6A shows a similar configuration to that of FIG. 4, however, the spring end 36 is angled upwardly to a lesser extent than that of FIG. 4. Further, the bushing 72 is configured to have an internal increased diameter portion 96 within the center bore 78. The increased diameter portion 96 receives a ball joint 98 to provide better fore and aft strength, i.e. axial stiffness, which is beneficial especially for heavy duty braking applications.

Using a resilient element to connect the spring body 32 to the vehicle structure 18 provides several benefits. By using resilient block connections, additional components previously required such as bushings, pins, bolts, etc. can be eliminated, resulting in reduced cost and weight. By insert molding or press-fitting a longitudinal bushing within the spring body 32 itself, the shackle connection is eliminated which also saves weight and cost.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A suspension spring assembly comprising:
   an elongated composite spring body having a first end and a second end longitudinally spaced apart from each other, wherein said elongated composite spring body is defined by a longitudinal length, a lateral width, and a thickness extending from an upper surface of said elongated composite spring body to a lower surface of said elongated composite spring body;
   a resilient element attached to at least one of said first and said second ends, said resilient element adapted to attach said elongated composite spring body to a vehicle frame, and wherein said resilient element comprises at least one bushing received within said at least one of said first and said second ends, said at least one bushing defining a longitudinal axis extending in a direction along said longitudinal length of said elongated composite spring body; and
   wherein said at least one of said first and said second ends includes at least one hole that is coaxial with said longitudinal axis of said at least one bushing, said at least one bushing being received within said at least one hole such that a length of said at least one bushing extends along said longitudinal axis.

2. The suspension spring assembly according to claim 1 wherein said resilient element includes at least one bore that receives a connecting element.

3. The suspension spring assembly according to claim 1 wherein said at least one bushing comprises an inner metal sleeve, an outer metal sleeve, and a resilient sleeve between said inner metal sleeve and said outer metal sleeve.

4. The suspension spring assembly according to claim 1 wherein said at least one bushing includes a bore receiving a connecting element, said bore being coaxial with said longitudinal axis.

5. The suspension spring assembly according to claim 1 wherein said one of said first and said second ends is curved upwardly such that said at least one bushing extends through said thickness of said elongated composite spring body in a generally longitudinal direction.

6. The suspension spring assembly according to claim 5 wherein said at least one bushing defines a central bore with an increased diameter rounded section to receive a ball joint.

7. The suspension spring assembly according to claim 1 wherein said at least one hole comprises at least first and second holes defining first and second longitudinal hole axes that are laterally spaced apart from each other, and wherein said at least one bushing comprises at least first and second bushings respectively mounted within said first and said second holes.

8. The suspension spring assembly according to claim 7 wherein said first and said second bushings respectively include first and second bores that are coaxial with said first and said second longitudinal hole axes, and including first and second connecting elements received within said first and said second bores.

9. The suspension spring assembly according to claim 7 wherein each of said first and said second bushings comprises a rigid inner sleeve, a rigid outer sleeve, and a resilient sleeve between said inner rigid sleeve and said outer rigid sleeve.

10. The suspension spring assembly according to claim 9 wherein said inner rigid sleeve has a greater longitudinal length than said outer rigid sleeve and said resilient sleeve.

11. The suspension spring assembly according to claim 9 wherein said inner rigid and said outer rigid sleeves are comprised of metal and said resilient sleeve is comprised of a resilient polymeric material.

12. A suspension spring assembly comprising:
an elongated composite spring body having a first end and a second end longitudinally spaced apart from each other, and wherein said elongated composite spring body is defined by a longitudinal length, a lateral width, and a thickness extending from an upper surface of said elongated composite spring body to a lower surface of said elongated composite spring body;
a resilient element attached to at least one of said first and said second ends, said resilient element adapted to attach said elongated composite spring body to a vehicle frame, and wherein said resilient element comprises at least one bushing received within said at least one of said first and said second ends, said at least one bushing defining a longitudinal axis extending in a direction along a longitudinal length of said elongated composite spring body;
wherein said at least one of said first and said second ends of said elongated composite spring body is curved upwardly such that said at least one bushing extends through said thickness of said elongated composite spring body in a generally longitudinal direction; and
wherein said at least one bushing comprises first and second bushings laterally spaced apart from each other.

13. A vehicle suspension comprising:
at least one leaf spring formed from a composite material, said at least one leaf spring having first and second ends longitudinally spaced apart from each other and a center portion supportable by a laterally extending axle;
a resilient element attached to at least one of said first and said second ends, said resilient element including at least one bore that receives a connecting element, said at least one bore defining a longitudinal axis extending in a direction along a longitudinal length of said at least one leaf spring, and wherein said resilient element comprises at least one bushing attached to said at least one of said first and said second ends, and wherein said resilient element cooperates with the connecting element such that said at least one leaf spring is attachable to a vehicle frame; and
wherein said at least one of said first and said second ends includes at least one hole defining a hole axis that is coaxial with said longitudinal axis, and wherein said at least one bushing is received within said at least one hole.

14. The vehicle suspension according to claim 13 wherein said at least one bushing extends through a thickness of said at least one leaf spring such that said at least one bushing is orientated to extend generally in a longitudinal direction.

15. The vehicle suspension according to claim 13 wherein said at least one bore in said at least one bushing includes an increased diameter rounded section, and wherein said connecting element comprises a ball joint that is received within said increased diameter rounded section.

16. The vehicle suspension according to claim 13 wherein said at least one bushing comprises at least first and second bushings with said at least one bore comprising first and second bores that respectively define first and second longitudinal axes that are laterally spaced apart from each other, with said first and second bores each receiving a connecting element, and wherein said at least one hole comprises at least first and second holes with first and second hole axes that are respectively coaxial with said first and second longitudinal axes.

17. The vehicle suspension according to claim 16 wherein each of said first and said second bushings comprises a rigid inner sleeve, a rigid outer sleeve, and a resilient sleeve between said inner rigid sleeve and said outer rigid sleeve with said connecting elements being received within said inner rigid sleeves.

18. A method of forming a leaf spring for a vehicle suspension comprising the steps of:
(a) forming an elongated spring body from a composite material;
(b) attaching a resilient element to at least one end of the elongated spring body, the resilient element comprising at least one bushing, wherein the at least one end of the elongated spring body includes at least one hole, and including installing the at least one bushing within the at least one hole; and
(c) forming at least one bore within the at least one bushing to receive a connecting element wherein the at least one bore defines a longitudinal axis extending in a direction along a longitudinal length of the elongated spring body, wherein the at least one hole defines a hole axis that is coaxial with the longitudinal axis, and wherein the resilient element cooperates with the connecting element such that the elongated spring body is attachable to a vehicle frame.

19. The method according to claim 18 wherein step (a) includes curving the at least one end of the elongated spring body upwardly to extend in a generally vertical direction, and forming a hole through the at least one end, and wherein step (b) includes installing the at least one bushing in the hole such that the at least one bushing extends in a generally longitudinal direction.

20. The method according to claim 18 wherein the at least one bushing comprises at least first and second bushings with the at least one bore comprising first and second bores that respectively define first and second longitudinal axes that are laterally spaced apart from each other, and wherein the at least one hole comprises at least first and second holes with first and second hole axes that are respectively coaxial with said first and second longitudinal axes, and including installing the first and second bushings within the first and second holes, and installing connecting elements in each of the first and second bores.

21. The method according to claim 20 including forming each of the first and said second bushings to include a rigid inner sleeve, a rigid outer sleeve, and a resilient sleeve between the inner rigid sleeve and the outer rigid sleeve, and with the connecting elements being received within the inner rigid sleeve.

* * * * *